US006817560B2

(12) United States Patent
Karp et al.

(10) Patent No.: US 6,817,560 B2
(45) Date of Patent: Nov. 16, 2004

(54) COMBINED TENSION CONTROL FOR TAPE

(75) Inventors: James Mitchell Karp, Tucson, AZ (US); John Alexander Koski, Livermore, CA (US); Steven Carter Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/233,588

(22) Filed: Sep. 4, 2002

(65) Prior Publication Data

US 2004/0041047 A1 Mar. 4, 2004

(51) Int. Cl.[7] ............................................. B65H 15/48
(52) U.S. Cl. .................. 242/334.3; 242/334.6
(58) Field of Search ............................ 242/334, 334.2, 242/334.3, 334.4, 334.6; 360/71, 73.04, 73.09, 73.14; 318/6, 7

(56) References Cited

U.S. PATENT DOCUMENTS

| 3,606,201 A |   | 9/1971 | Petusky ...................... 242/190 |
|---|---|---|---|
| 3,809,335 A |   | 5/1974 | Mantey ...................... 242/186 |
| 3,913,134 A | * | 10/1975 | Sargunar ................... 360/73.04 |
| 3,913,866 A |   | 10/1975 | Hankins ..................... 242/191 |
| 4,015,799 A |   | 4/1977 | Koski et al. ................ 242/203 |
| 4,125,881 A | * | 11/1978 | Eige et al. .................... 360/50 |
| 4,232,257 A | * | 11/1980 | Harshberger, Jr. .......... 318/271 |
| 4,400,745 A |   | 8/1983 | Shu ............................... 360/73 |
| 4,494,711 A | * | 1/1985 | Van Pelt ................... 242/331.2 |
| 4,531,166 A | * | 7/1985 | Anderson ................. 360/73.04 |
| 4,807,107 A |   | 2/1989 | Fincher ....................... 364/148 |
| 4,817,887 A | * | 4/1989 | Harigaya et al. ........ 242/334.2 |
| 5,039,027 A |   | 8/1991 | Yanagihara et al. ........ 242/190 |
| 5,222,684 A | * | 6/1993 | Yoneda et al. ............ 242/334.2 |
| 5,277,378 A |   | 1/1994 | Ebisawa ..................... 242/190 |
| 5,282,586 A |   | 2/1994 | Suzuki et al. ............... 242/190 |
| 5,367,471 A | * | 11/1994 | Nguyen et al. ............. 360/74.3 |
| 5,836,533 A |   | 11/1998 | Hallamasek .............. 243/334.6 |
| 5,860,610 A |   | 1/1999 | Nishida et al. .......... 242/334.2 |
| 5,921,493 A |   | 7/1999 | Kohno .................... 242/334.3 |
| 6,305,629 B1 |   | 10/2001 | Chliwnyj et al. ........ 242/334.3 |

FOREIGN PATENT DOCUMENTS

| JP | 62051061 | 3/1987 | .......... G11B/15/43 |
|---|---|---|---|
| JP | 3-171459 | 7/1991 | .......... G11B/15/46 |
| JP | 4178948 | 6/1992 | .......... G11B/15/43 |
| JP | 6349153 | 12/1994 | .......... G11B/15/43 |
| JP | 8167201 | 6/1996 | .......... G11B/15/46 |

* cited by examiner

*Primary Examiner*—Kathy Matecki
*Assistant Examiner*—Scott J. Haugland
(74) *Attorney, Agent, or Firm*—John H. Holcombe

(57) ABSTRACT

Dynamic tension control for tape transported along a tape path between supply and take-up reels, driven by supply and take-up motors, and having tachometers for determining linear speed of the tape. A controller accelerates the tape toward a target speed, initially operating the motors in static acceleration tension control; and if the linear speed of the tape is within a predetermined range of the target tape speed, operating the motors in composite tension control employing static tension control and delta velocity control.

32 Claims, 4 Drawing Sheets

COMBINED TENSION CONTROL FOR TAPE

Commonly assigned U.S. Pat. No. 6,712,302 is incorporated for its showing of delta velocity tension control for tape.

FIELD OF THE INVENTION

This invention relates to the transport of tape between reels, and, more particularly, to tension control of tape during direct transport between the reels without significant buffering of the tape.

BACKGROUND OF THE INVENTION

A tape that is directly transported between a supply reel and a take-up reel requires precise control of the tape tension to provide smooth constant tape speed, and, if the tape is to be accelerated and decelerated, to provide smooth acceleration and deceleration of the tape, and to prevent damage to the tape. One example of a direct tape transport is a magnetic tape drive, in which a magnetic tape is transported along a tape path past a read/write head located in the tape path, such that the magnetic read/write head may read and/or write data on the magnetic tape, and the magnetic tape is stopped and started to read and/or write data at desired locations of the magnetic tape. Another example of a direct tape transport is a printing press in which a tape (paper web) is transported between reels past printing rolls under precise timing, and new rolls of paper web must be accelerated to speed smoothly without damage and without smudging at the printing rolls. Herein, the term "tape" is defined as comprising tape or web in any suitable elongate form; the term "reel" is defined as comprising a reel or spool that is removable or permanent, and provides the spool or axis at which the tape is wound and/or unwound; and the terms "supply" and "take-up" reels refer to the two reels of a two reel system, typically respectively from which the tape originates and to which the tape is directed, but the tape may be wound and unwound with respect to either reel in a bi-directional fashion.

One or more electromechanical tape tension transducers can be mounted in the tape path to monitor tape tension, and the supply and/or take-up reel motors are controlled to provide a nominal tape tension and to tend to offset errors in tape tension. Examples of tape tension transducers comprise U.S. Pat. Nos. 5,282,586, 5,277,378, 5,039,027, 4,807,107, and 3,606,201, all of which illustrate the use of tension arms. U.S. Pat. No. 3,809,335 indicates that other types of sensors may alternatively be used, such as a pressure responsive air jet or bearing, or a load cell. Another example of a tape tension transducer is a direct sensing pressure transducer. However, a delicate balance is maintained in designing tape tension transducers to both be robust and reliable, yet also to be accurate throughout a wide range of frequencies of tape tension variation, without resonances. The tape tension transducers, by virtue of the mechanical aspects, have upper limits to the effective range of tension measurement, for example, defined by resonance of the mechanism. U.S. Pat. No. 4,400,745 estimates tension by summing the currents from both the supply reel and the take-up reel motors, divides the result by two, and equates the same to tape tension. In U.S. Pat. No. 3,913,866, a signal proportional to the angular velocity of the supply and take-up reels is generated at each reel and supplied to a torque device at the other reel. Japan JP6-349153 compares a frequency of a motor or reel to an expected frequency to correct the torque of a motor to obtain stable tape tension without providing a tension lever or arm. Such rough estimates of the tape tension are not sufficiently accurate for modern high speed tape motion.

A precise control of tape tension is illustrated by U.S. Pat. No. 4,015,799 which determines tape tension based on the differences in torque as applied to the supply and take-up reels. Lineal tape position and angular reel displacement for both reels are monitored to determine reel radii, tape inertia and velocity or position error. A motor current algorithm is utilized to generate the appropriate torque for each reel to drive the error to zero along a predetermined profile with negligible tape tension disturbances. U.S. Pat. No. 5,860,610 discusses defining the reel inertia similar to that of the '799 patent, employing a conversion table, to control the torque of a motor, and a second embodiment in which the output of a pressure sensitive tension sensor is differentiated and combined with the output of a torque modulator. In a third embodiment, change in rotating speed of a supply reel is employed with the torque modulator in an attempt to suppress the change in speed.

Modern tapes are driven at high speeds and are subject to high acceleration and deceleration rates, and are more sensitive to changes in tape tension, for example, in that the speed variation at the tape head will result in data read or write errors, or smudging at a print roll. In the case of magnetic tape, modern tapes are thinner to allow more tape to be spooled on a reel at the same diameter, and thereby to allow a greater data storage capacity. Hence, such tapes are more sensitive to changes in tape tension, and may be subjected to damage, such as tape stretch.

SUMMARY OF THE INVENTION

In accordance with the present invention, tension control systems, methods, and tape transports provide dynamic tension control for tape transported along a tape path between a supply reel and a take-up reel, the supply reel driven by a supply reel motor, and the take-up reel driven by a take-up reel motor.

In one embodiment, a supply tachometer measures the rotational angular displacement of the supply reel, and a take-up tachometer measures the rotational angular displacement of the take-up reel. A tension control system controller:

upon accelerating the tape toward a target tape speed;
initially operates the supply reel motor and the take-up reel motor in static acceleration tension control;
measures the rotational angular displacement of at least one of the supply reel from the supply tachometer, and of the take-up reel from the take-up tachometer;
determines from the measured rotational angular displacement, the rotational angular velocity of at least one of the supply reel and the take-up reel;
determines from the rotational angular velocity, a linear speed for the tape;
if the linear speed of the tape is less than a predetermined range of the target tape speed, continues the static acceleration tension control;
if the linear speed of the tape is within the predetermined range of the target tape speed, operates the supply reel motor and the take-up reel motor in composite tension control employing static tension control and delta velocity control.

In another embodiment, a tape tension transducer is provided in the tape path for measuring the tension of the tape, and the controller operates the supply reel motor and the take-up reel motor in static acceleration tension control, additionally employing direct tension sensing of the tape tension transducer; and operates the supply reel motor and the take-up reel motor in composite tension control, additionally employing direct tension sensing of the tape tension transducer.

In a further embodiment, the controller operates the supply reel motor and the take-up reel motor in composite acceleration tension control towards the target tape speed and in composite steady state tension control while maintaining substantially the target tape speed.

In a still further embodiment, the controller, in initially operating the supply reel motor and the take-up reel motor in static acceleration tension control, in continuing the static acceleration tension control, and in operating the supply reel motor and the take-up reel motor in composite tension control, each comprises the controller operating the supply reel motor and the take-up reel motor employing the direct tension control for tension variation of frequencies less than a predetermined frequency. In one embodiment, the predetermined frequency is less than a resonant frequency of the tape tension transducer.

In another embodiment, the controller, in operating the supply reel motor and the take-up reel motor employing composite tension control, comprises the controller determining the rotational angular velocity of the supply reel and the take-up reel, and operating the supply reel motor and the take-up reel motor employing the composite tension control if the rotational angular velocity of the reels each exceeds a predetermined minimum rotational angular velocity related to a minimum sample rate of the determination of the rotational angular velocity.

In still another embodiment, the controller:
upon decelerating the tape from a steady state tape speed;
initially operates the supply reel motor and the take-up reel motor in composite deceleration tension control employing static tension control and delta velocity control;
measures the rotational angular displacement of at least one of the supply reel from the supply tachometer, and of the take-up reel from the take-up tachometer;
determines from the measured rotational angular displacement, the rotational angular velocity of at least one of the supply reel and the take-up reel;
determines from the rotational angular velocity, a linear speed for the tape;
if the linear speed of the tape is within a predetermined range of the steady state tape speed, continues the composite deceleration tension control;
if the linear speed of the tape is less than the predetermined range of the steady state tape speed, operates the supply reel motor and the take-up reel motor in static tension control.

In a still further embodiment, the controller operates the supply reel motor and the take-up reel motor in composite deceleration tension control, additionally employing direct tension sensing of a tape tension transducer; and operates the supply reel motor and the take-up reel motor in static tension control, additionally employing direct tension sensing of the tape tension transducer.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
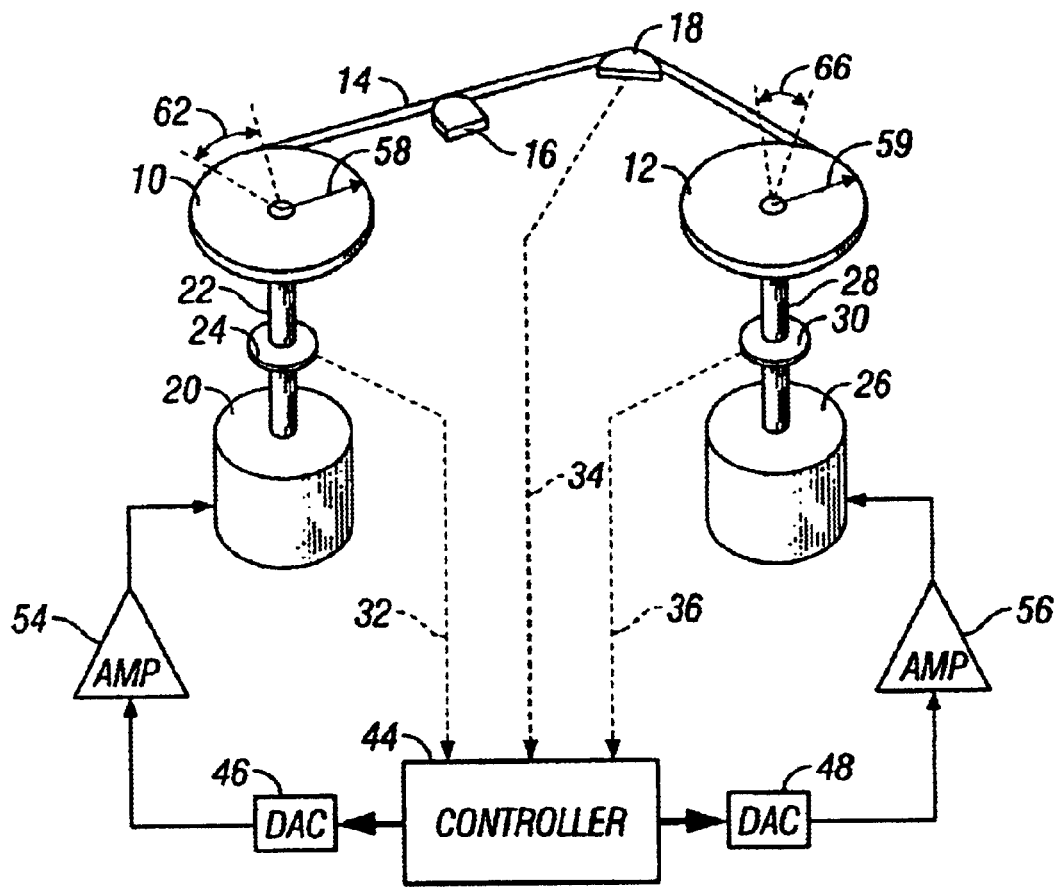
FIG. 1 is a block diagrammatic representation of a tape transport and tension control system in accordance with an embodiment of the present invention.

Referring to FIG. 1, a tape transport and tension control system is illustrated which comprises a tape 14, such as a magnetic tape, which is transported along a tape path between a supply reel 10 and a take-up reel 12. As an example, a read/write head 16 is located in the tape path, such that the tape is transported between the supply reel 10 and the take-up reel 12 past the read/write head 16. An optional tape tension transducer 18 is provided in the tape path for measuring the tension of the tape in the tape path.

The supply reel 10 is driven by a supply reel motor 20, for example, via a shaft 22. A supply tachometer 24 is arranged to measure the rotational angular displacement of the supply reel 20. Similarly, the take-up reel 12 is driven by a take-up reel motor 26, for example by means of a shaft 28. A take-up tachometer 30 is arranged to measure the rotational angular displacement of the take-up reel.

As discussed above, the terms "supply" and "take-up" reels refer to the two reels of a two reel system, and typically are used to describe respectively the supply reel from which the tape originates and the take-up reel to which the tape is directed, but the tape may be wound and unwound with respect to either reel in a bi-directional fashion.

The tachometers 24, 30 may be mounted at the respective shafts, at the respective motors, or at the respective reels, and may comprise optical or magnetic tachometers, such as are known to those of skill in the art. In one example, digital optical line tachometers comprise 1024 marks for a full revolution of the associated reel or motor.

One embodiment of a tape transport is described in coassigned U.S. Pat. No. 4,015,799, and may implement the present invention. An incremental encoder tape tachometer is discussed in the '799 patent, but is not necessary to the present invention and is not shown herein. The incremental encoder tape tachometer illustrated in the '799 patent is useful for determining the actual travel of the tape, from which the radii of the reels may be determined. Rather, in the illustrated embodiment of FIG. 1, the beginning radius of the take-up reel 12 is known as the tape is initially wound onto the reel, and the angular displacement of the take-up tachometer 30 as the tape 14 is initially wound on the take-up reel may be employed together with the angular displacement of the supply tachometer 24 to determine the radius of the supply reel 10.

As is understood by those of skill in the art, and as explained in the '799 patent, the radii of the reel to which the tape is wound steadily increase, while the radii of the reel from which the tape is unwound steadily decrease.

The optional tape tension transducer 18 may comprise any suitable type of tension transducer known to those of skill in the art, examples of which comprise direct sensing pressure transducers, load cells, or tension arms. In one example of a direct sensing pressure transducer, the capacitance between two plates varies with respect to the tape tension. Pressure responsive air jet or air bearing transducers may also be employed, but are often expensive without an accompanying air bearing system for the tape transport. The tape tension transducer 18 provides a signal, such as an analog signal, representing the tension of the tape 14 in the tape path, which is converted to digital by an A/D converter, as is known to those of skill in the art.

An output 32 of the supply tachometer 24, an output 34 of the tape tension transducer 18, and an output 36 of the take-up tachometer 30 are supplied to a controller 44. The controller 44 may comprise a special motion control logic such as is discussed in the '799 patent, or may comprise a microprocessor controller such as is known to those of skill in the art.

The controller 44 employs the outputs 32, 36 of the supply and take-up tachometers to maintain tension control tending to maintain the tension of tape 14 constant by operating at least one of the supply reel motor 20 and the take-up reel motor 26 in accordance with the tension control of the present invention, as will be discussed, to provide a torque to at least one of the supply reel and the take-up reel tending to reduce any error from a nominal tension value. The output of the controller 44, in one example, is in digital form and drives digital-to-analog converters 46, 48. The outputs of the digital-to-analog converters 46 and 48 are fed to current mode power amplifiers 54 and 56, which supply motor current to the supply reel motor 20 and the take-up reel motor 26.

The present invention relates to reducing error from a nominal tension value at various linear speeds of the tape.

The nominal tension value is predetermined, and may be based on the pressure to be exerted by the tape on the read/write head 16, or on the print rolls, and/or on the stability of the tape in the tape path, as is known to those of skill in the art. The nominal tension value is typically the same at all tape speeds, but it may be desirable to have different nominal tension values for acceleration, steady state, deceleration, or when the tape is stopped. Thus, the term "nominal" tension value as employed herein is not necessarily the same for all speeds of the tape.

Three types of tension control are employed in various embodiments of the present invention.

Static Tension Control

First, "static tension control" is derived by calculation, as is discussed in the '799 patent. The static tension calculation is also called the "sum of torques" calculation, and static tension control is open loop with no feedback.

As an example, the torque equations for each motor 20 and 26, which may be used to set the static tension level of the tape with no feedback are:

$$J1*alpha1 = I1Kt1 + Ft*R1 + Ff1*R1 \text{ and}$$

$$J2*alpha2 = I2Kt2 + Ft*R2 + Ff2*R2.$$

Solving for the plant inputs, I1 and I2, $$I1 = (J1*alpha1 + Ft*R1 + Ff1*R1)/Kt1 \text{ and}$$

$$I2 = (J2*alpha2 + Ft*R2 + Ff2*R2)/Kt2,$$

Where,
  I1=motor current 1
  Kt1=motor torque constant 1
  J1=motor inertia 1
  alpha1=the angular acceleration of motor 1
  R1=radius of reel 1
  Ff1=friction force (at the tape) applied to motor 1
  And the corresponding parameters with "2" apply to motor 2.

The friction force for the two reels is the sum of the tape path friction force and the motor rotation friction torque for each motor multiplied by the radius of each motor. The friction force in general is not a linear function of the plant states, and is modeled by nonlinear equations.

The two motor currents, I1 and I2, are provided by the control system law by solving the above equations to provide the desired tape tension, tape velocity, and to overcome friction. When a velocity error exists, the reels are controlled to reduce the error with reel angular accelerations that produce the same linear tape acceleration at the two reels. Each motor current is made up of an acceleration current, a tension current, and a friction current. Rewriting the equations in this way, we have, $$I1 = Iacceleration1 + Itension1 + Ifriction1 \text{ and}$$

$$I2 = Iacceleration2 + Itension2 + Ifriction2,$$

Where
  Iaccleration1=(J1*alpha1)/Kt1,
  Itension1=Ft*R1/Kt1,
  Ifriction1=Ff1*R1/Kt1.

And the corresponding parameters with "2" apply to motor 2. The system provides the static tension level in the drive by the two equations, for each reel.

$$Itension1 = Ft*R1/Kt1 \text{ and}$$

$$Itension2 = Ft*R2/Kt2.$$

Direct Tension Control

Second, the optional tape tension transducer 18 of FIG. 1 provides a direct tension measurement which can indicate that the actual tension is different than the desired tension as calculated for static tension control, for example, because of tape stick at the reel from which the tape is being unwound.

The method for providing direct tension force sensing is a modification of the above equations. A tension sensing device is added to the plant to sense the actual tension level of the tape. The transducer produces a signal representing tape tension, that is converted to a digital number for use in the control system. The sensed tension signal is subtracted from a reference tension value to produce a tension error value. This tension error is added to the static tension number in the above equations. The resulting control equations for tension then become:

$$Itension1 = [Ft + (Fref - Fsense)*Gtension]*R1/Kt1,$$

and $$Itension2 = [Ft + (Fref - Fsense)*Gtension]*R2/Kt2.$$

Where

Fref=reference tension signal,

Fsense=sensed tension signal, and

Gtension=tension feedback compensator transfer function.

When the actual steady-state tension in the tape is equal to the reference or desired tension level, the steady-state value of the term (Fref–Fsense) equals zero, and the feedback signal doesn't modify the static tension setting. If plant parameters, such as motor torque constant, and amplifier gain, are not nominal, the direct tension force sensing will provide correction value to the static tension, Ft, to correct for such deviations.

Figure 2:
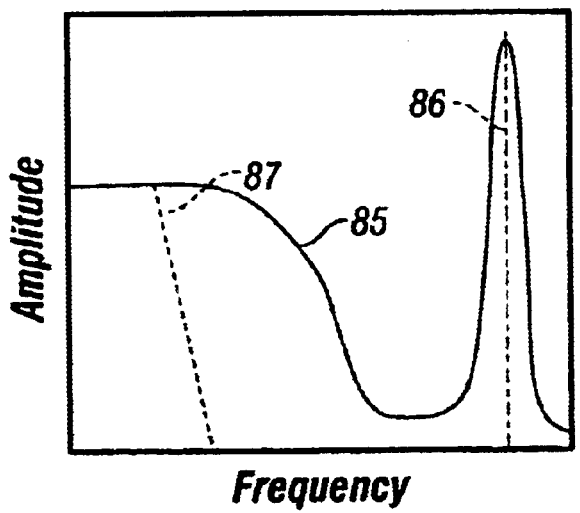
FIG. 2 is a representation of the response of a tension transducer at various frequencies.

Referring to FIG. 2, the response curve 85 of tape tension transducers, by virtue of the mechanical aspects, have upper limits to the effective range of tension measurement, for example, defined by resonance 86 of the mechanism. The tension feedback compensator transfer function Gtension 87 therefore cuts off the response of the transducer prior to reaching the resonance frequency. In addition, the transfer function of the tension feedback compensator can correct for low-frequency disturbances due to tape start and stop cycles, but the bandwidth of this system is limited by the bandwidth of the tension sensing transducer.

Delta Velocity Control

Third, delta velocity control is discussed in the incorporated U.S. Pat. No. 6,712,302 and is closed loop tension control.

To improve the dynamic performance of the tension control in the tape transport, the method of delta velocity control is employed. This technique provides information about the rate of change of tension, and can be used to sense tension changes, and feed them back to the plant before actual tension changes develop. Since velocity of each reel is sensed and computed, these signals can be used to compute the rate of change of tension with no bandwidth constraints, other than the sampling rate for these measurements.

The equation for the tension force in the tape is given below:

$$Ft=(theta1*R1-theta2*R2)*Ks+(omega1*R1-omega2*R2)Kd.$$

Where theta1=angular position of reel 1 theta2=angular position of reel 2 omega1=angular speed of reel 1 omega2=angular speed of reel 2

Ks=spring constant of the tape, and

Kd=damping constant of the tape.

When a tension transient occurs, the tape path of the plant will respond with a damped sinusoidal variation in tension. This is a classical response for this type of second-order system. The damping in the system, without tension feedback, is determined by the tape damping constant, Kd. This term is typically quite small, resulting in a sinusoidal oscillation in tension that continues for a long time. If successive transients occur, they can add to the amplitude of the damped sinusoid, resulting in increased levels of tension variations.

The method of differential or delta velocity control of tension transients provides a direct method to increase the damping of the tape path. The velocity of the tape at each reel is given by the equations:

$$Vt1=omega1*R1$$

$$Vt2=omega1*R2.$$

The values of Vt1 and Vt2 are measured in the plant with sensors such as digital encoders arranged to measure the angular displacements of the reel motors, which provide a measurement of omega1 and omega2. Since the radius of each tape reel is known in the control system, Vt1 and Vt2 are computed by the above equations. The delta velocity is computed by the following equation.

$$Vdelta=Vt1-Vt2.$$

This equation can be rewritten as follows.

$$Vdelta=(omega1*R1-omega2*R2).$$

Note that the value computed for Vdelta by the control system is exactly the value in the tape path that provides damping to the tension transients by the tape damping constant, Kd. Additional damping can therefore be provided in the control system by including the term, Vdelta, in the feedback to the two motor currents. In this manner, damping torques will be developed in each motor to provide additional damping to the tension transients, which are being sensed as a delta velocity between the two tape velocities at the reels.

To include this delta velocity feedback in the tension motor current calculation law, the equations for tension current are modified as follows.

$$Itension1=[Ft+(Vdelta*Gdelta)+(Fref-Fsense)*Gtension]*R1/Kt1,$$
and $$Itension2=[Ft+(Vdelta*Gdelta)+(Fref-Fsense)*Gtension]*R2/Kt2.$$

Figure 3:
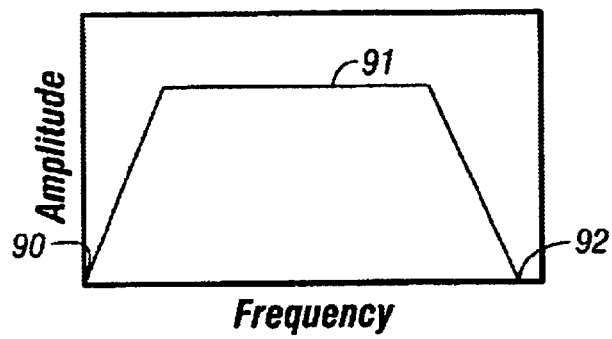
FIG. 3 is a representation of the response of composite tension control at various frequencies.

Referring to FIG. 3, this last set of equations provides additional tension damping forces in the plant to counteract the tension transients. The compensator Gdelta is arranged to provide zero gain at DC 90 and useful control gain 91 with stability enhancement at higher frequencies up to a limit 92 set by the velocity sampling rate.

Figure 4:
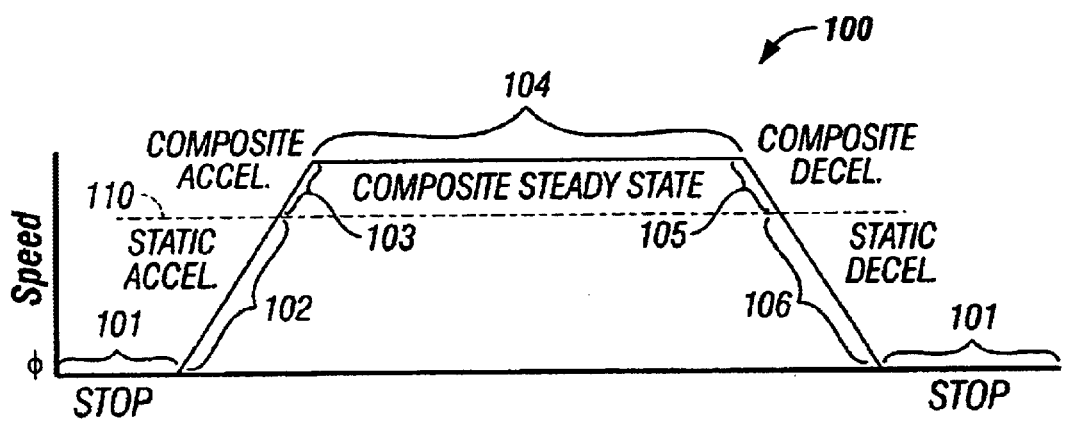
FIG. 4 is a diagrammatic representation of tension control in accordance with an embodiment of the present invention at various tape speeds.

Referring to FIG. 4, one embodiment of the present invention comprises state-based switching of the tension control.

Plot 100 represents linear speed of the tape as the tape reel to reel control system moves the tape through seven primary states. State 101 represents stop lock, where there is no motion and the tape is stopped, but the tape is maintained at a nominal tension. The next state 102 represents initial acceleration of the tape towards a target tape speed, where both reels are accelerated at the same linear tape rate towards the target tape speed while maintaining a nominal tension. In accordance with the present invention, a tension control system controller, upon accelerating the tape toward a target tape speed in state 102, initially operates the supply reel motor and the take-up reel motor in static acceleration tension control, and optionally employs direct tension sensing of the tape tension transducer. So long as the linear speed of the tape is less than a predetermined range of the target tape speed, the static acceleration tension control is continued. The predetermined range of tape speed is represented by line 110, and may, for example, comprise tape speed within substantially 20 percent of the target tape speed. No specific limit is placed herein for the predetermined range, and the selection is based, for example, on the detection capability of the tachometers and operational capability of the controller and the reel motors. The predetermined range 110 may comprise a proportion of the target tape speed or may comprise an absolute value or signed value difference as are understood by those of skill in the art.

The next state 103 represents acceleration to within the predetermined range 110 and comprises continued acceleration, where both reels are accelerated at the same linear tape rate towards the target tape speed while maintaining a nominal tape tension. Velocity feedback information can be used to maintain the desired acceleration rate. In accordance with the present invention, if the linear speed of the tape is within the predetermined range 110 of the target tape speed, the tension control system controller operates the supply reel motor and the take-up reel motor in composite tension control employing static tension control and delta velocity control, and optionally employs direct tension sensing of the tape tension transducer.

The next state 104 represents the steady state movement of the tape at substantially the target tape speed. The target tape speed and a nominal tape tension are maintained. Error terms generate acceleration forces used to maintain speed and tension. Steady state control may be reached at a tape speed that is relatively close to the target tape speed. As an example, in magnetic tape drives, steady state control may be reached within 5 percent of the target tape speed. Again, no specific limit is placed herein for steady state control, and the selection is based on the operational capability of the speed control system. In accordance with the present invention, the tension control system controller operates the supply reel motor and the take-up reel motor in composite steady state tension control employing static tension control and delta velocity control, and optionally employs direct tension sensing of the tape tension transducer.

The next state 105 represents initial deceleration of the tape from the steady state tape speed. Both reels are decelerated at the same linear tape rate towards zero tape speed while maintaining a nominal tension. Velocity feedback information can be used to maintain the desired deceleration rate. In accordance with the present invention, the tension control system controller initially operates the supply reel motor and the take-up reel motor in composite deceleration tension control employing static tension control and delta velocity control, and optionally employs direct tension sensing of the tape tension transducer. So long as the linear speed of the tape is within a predetermined range 110 of the steady state tape speed, the composite deceleration tension control is continued. The predetermined range of tape speed may be the same as for composite acceleration tension control, or may be different. Again, no specific limit is placed herein for the predetermined range, and the selection is based on the same factors as the composite acceleration tension control, and, for example, may comprise detection capability of the tachometers and operational capability of the controller and the reel motors.

The next state 106 represents deceleration of the tape to below the predetermined range 110 of tape speed. Both reels are decelerated at the same linear tape rate towards zero tape speed while maintaining tension. In accordance with the present invention, if the linear speed of the tape is less than the predetermined range 110 of the steady state tape speed, the tension control system controller operates the supply reel motor and the take-up reel motor in static tension control, and optionally employs direct tension sensing of the tape tension transducer.

After the tape has been decelerated to zero tape speed, state 101 is again entered, during which a nominal tension is maintained. Another state is not shown, and is entered only if a severe tension or velocity error is detected, and comprises a state of "dropped tension" at which the tape is at rest and tension and velocity control are inhibited.

Figure 5:
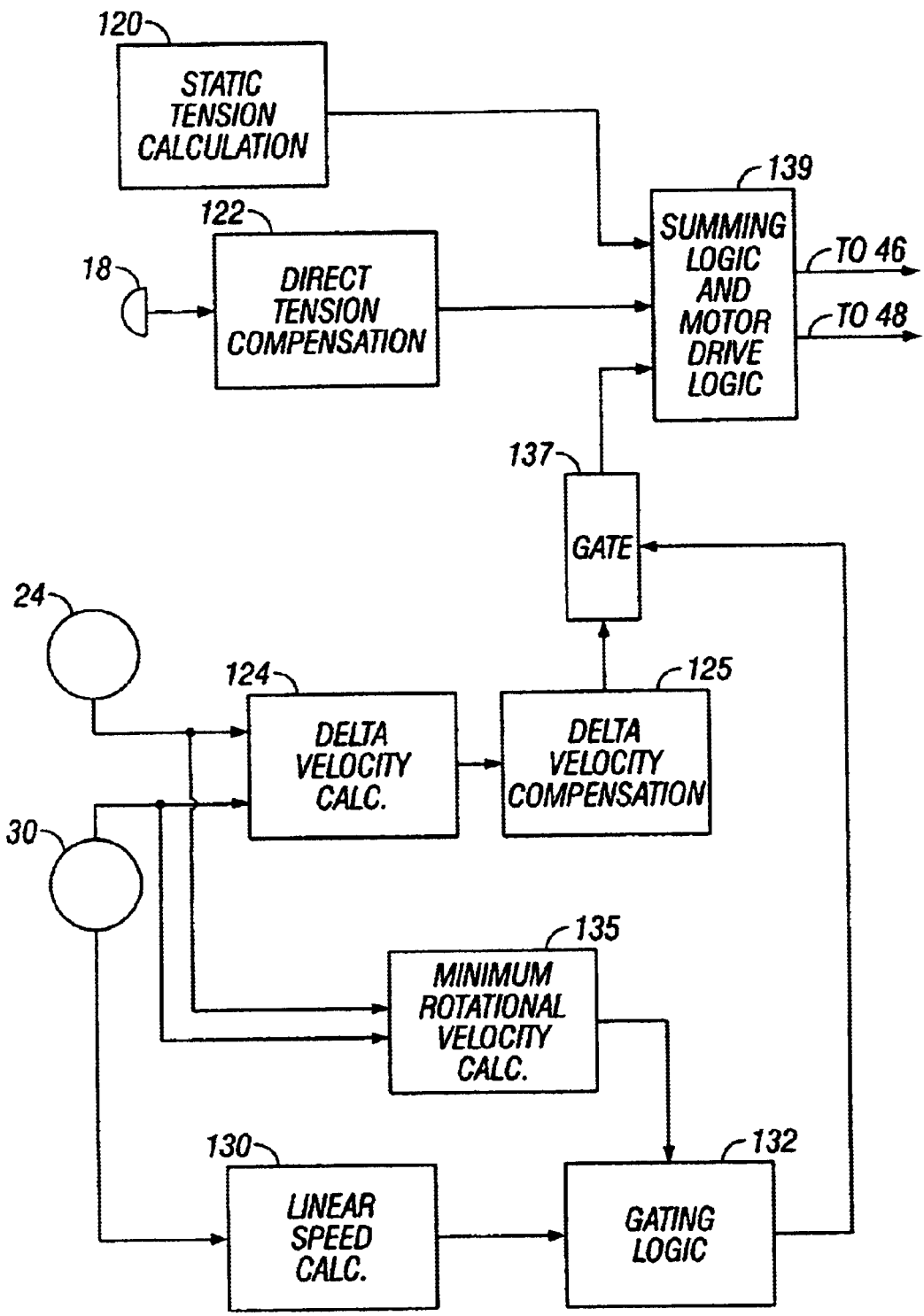
FIG. 5 is a logic block diagram of operation of a tension control system of FIG. 1.

As discussed above, the controller 44 of FIG. 1 may comprise a special motion control logic such as is discussed in the '799 patent, or may comprise a microprocessor controller. FIG. 5 represents an example of the logic of operation of a tension control system of FIG. 1. In FIG. 5, the static tension calculation of the '799 patent is represented by block 120. The tape tension transducer 18 provides a signal, such as a digital signal, representing the tension of the tape in the tape path, and block 122 represents the tension feedback compensator transfer function Gtension, discussed above.

Block 124 represents the delta velocity calculation, which employs the angular displacements measured by the tachometers 24 and 30 of FIG. 1, and block 125 represents the delta velocity compensation, the delta velocity as discussed above and in the incorporated U.S. Pat. No. 6,712,302.

Block 130 represents the linear speed calculation of the present invention which is conducted based on the angular displacement measured by one or both of the tachometers 24 and 30 of FIG. 1, e.g., by multiplying the rotational angular displacement by the current radius of the tape at the corresponding reel 10, 12; and gating logic 132 represents setting the predetermined range of tape speed to gate the composite acceleration tension control, the composite steady state tension control, and the composite deceleration tension control, discussed above.

Additionally, as represented by block 135, in another embodiment of the present invention, the controller, in operating the supply reel motor and the take-up reel motor employing composite tension control, comprises the controller determining the rotational angular velocity of the supply reel (from tachometer 24) and the take-up reel (from tachometer 30), and operating the supply reel motor and the take-up reel motor employing the composite tension control if the rotational angular velocity of the reels each exceeds a predetermined minimum rotational angular velocity related to a minimum sample rate of the determination of the rotational angular velocity. For example, one of the reels may be nearly empty, and the other reel filled to maximum capacity of wound tape. The reel filled to maximum capacity rotates very slowly, such that the output of the associated tachometer provides an insufficient number of output signals to provide a precise measurement of tape velocity to operate the delta velocity logic.

Thus, gating logic, upon meeting the predetermined criteria, operates logic gate 137 to additionally provide composite acceleration tension control, composite steady state tension control, or composite deceleration tension control, discussed above.

Summing logic and motor drive logic 139 sums the signals from the employed tension control techniques and provides the outputs to digital-to-analog converters 46 and 48 of FIG. 1 to operate the supply reel motor and the take-up reel motor.

With the incorporation of the output of the tension transducer 18 at summing logic and motor drive logic 139, the controller, in initially operating the supply reel motor and the take-up reel motor in static acceleration tension control, in continuing the static acceleration tension control, and in operating the supply reel motor and the take-up reel motor in composite tension control, each comprises the direct tension compensation logic 122 of the controller operating the supply reel motor and the take-up reel motor employing the direct tension control for tension variation of frequencies less than a predetermined frequency, and, in one embodiment as illustrated in FIG. 2, the predetermined frequency 87 is less than a resonant frequency 86 of the tape tension transducer.

Figure 6:
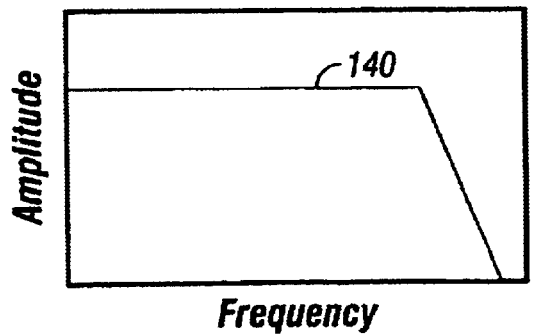
FIG. 6 is a representation of combined tension control response at various frequencies.

FIG. 6 illustrates an example of the response 140 of the combined tension control system in accordance with the present invention at the outputs of summing logic 139 of FIG. 5, when operating with static tension control and with composite tension control.

Figure 7:
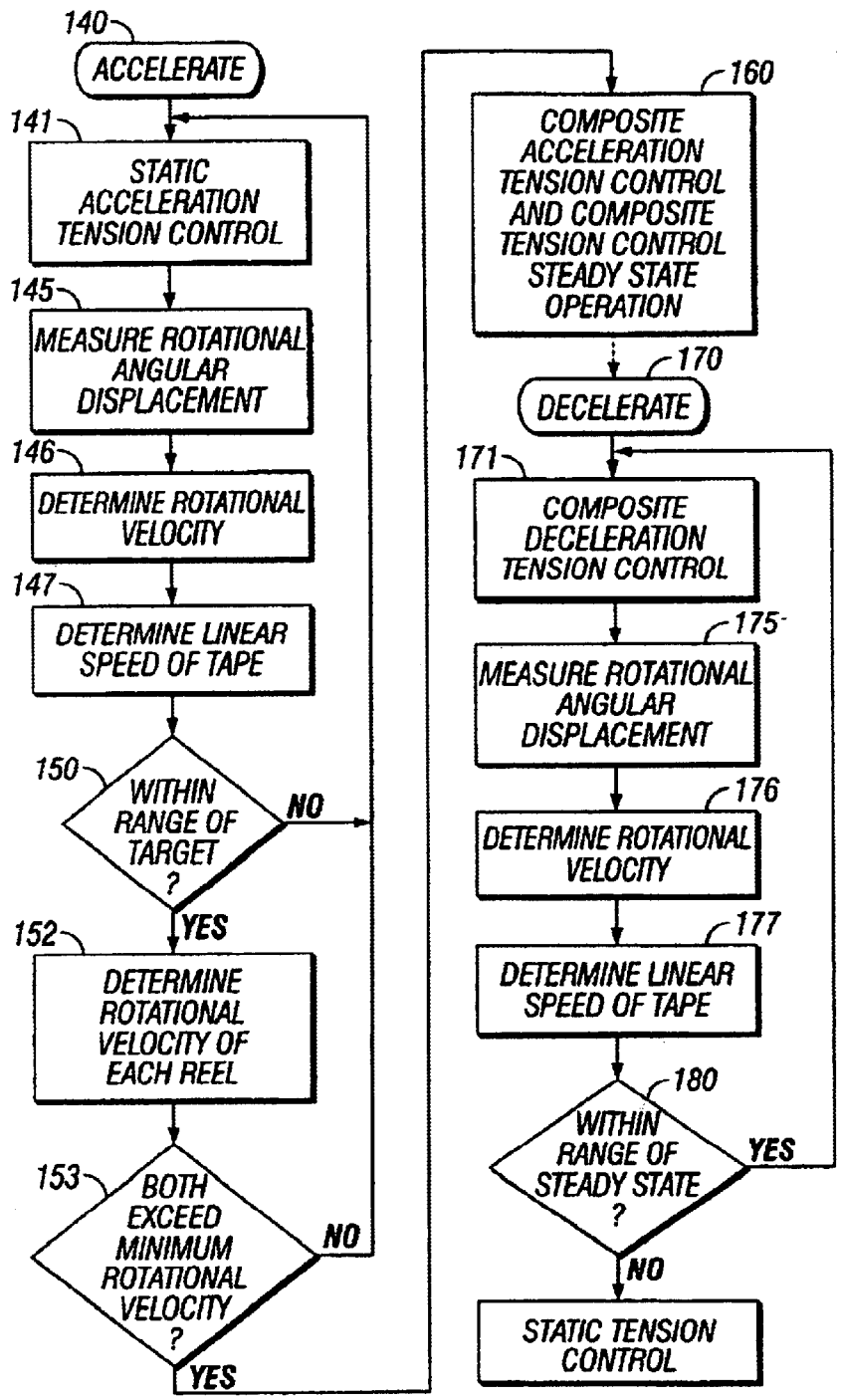
FIG. 7 is a flow chart depicting an embodiment of the method of the present invention for operating the tape transport and tension control system of FIG. 1.

FIG. 7 depicts an embodiment of the method of the present invention for operating the tape transport and tension control system of FIG. 1. As discussed above, a tension control system controller (e.g., controller 44 of FIG. 1 and logic of FIG. 5), upon accelerating the tape toward a target tape speed at step 140, initially in step 141 operates the supply reel motor and the take-up reel motor in static tension control, and optionally employs direct tension sensing of the tape tension transducer.

In step 145, the tension control system measures the rotational angular displacement of at least one of the supply reel from the supply tachometer, e.g., tachometer 24 of FIG. 1, and of the take-up reel from the take-up tachometer, e.g., tachometer 30 of FIG. 1. In step 146 of FIG. 7, the controller determines from the measured rotational angular displacement of step 145, the rotational angular velocity of at least one of the supply reel and the take-up reel. In step 147, the controller determines from the rotational angular velocity of step 146, a linear speed for the tape, e.g., employing the current radius of the corresponding reel. The determination of linear tape speed based on the current radius of the tape at the associated reel or reels, is discussed in the '799 patent.

In step 150, the controller determines whether the linear speed of the tape from step 147 is within a predetermined range of the target tape speed or is less than the predetermined range of the target tape speed. If the linear speed of the tape is less than the predetermined range, the controller continues the static acceleration tension control at step 141.

If the linear speed of the tape is within the predetermined range of the target tape speed, as determined in step 150, in one embodiment of the present invention, the controller determines, in step 152, the rotational angular velocity of the supply reel (from tachometer 24 of FIG. 1) and the take-up reel (from tachometer 30 of FIG. 1). In step 153, the controller determines whether the rotational angular velocity of the reels each exceeds a predetermined minimum rotational angular velocity related to a minimum sample rate of the determination of the rotational angular velocity, as discussed above. If one of the reels fails to exceed the predetermined rotational angular velocity, the sample rate may be insufficient for the delta velocity tension control, and the process therefore continues with the static tension control of step 141.

If the rotational angular velocity of the reels each exceeds the predetermined minimum rotational angular velocity as determined in step 153, the controller, in step 160, operates the supply reel motor and the take-up reel motor in composite tension control employing static tension control and delta velocity control, and optionally employs direct tension sensing of the tape tension transducer, as represented by states 103 and 104 in FIG. 4.

The controller, upon decelerating the tape from a steady state tape speed at step 170 of FIG. 7, initially in step 171 operates the supply reel motor and the take-up reel motor in composite deceleration tension control employing static tension control and delta velocity control, and optionally employs direct tension sensing of the tape tension transducer, as represented by state 105 in FIG. 4.

In step 175 of FIG. 7, the tension control system measures the rotational angular displacement of at least one of the supply reel from the supply tachometer, e.g., tachometer 24 of FIG. 1, and of the take-up reel from the take-up tachometer, e.g., tachometer 30 of FIG. 1. In step 176 of FIG. 7, the controller determines from the measured rotational angular displacement of step 175, the rotational angular velocity of at least one of the supply reel and the take-up reel. In step 177, the controller determines from the rotational angular velocity of step 176, a linear speed for the tape. The determination of linear tape speed is based on the current radius of the tape at the associated reel or reels, as discussed in the '799 patent.

In step 180, the controller determines whether the linear speed of the tape from step 177 is within a predetermined range of the steady state tape speed or is less than the predetermined range of the steady state tape speed. Again, the predetermined range of step 180 may be the same as or different from the predetermined range of step 150, as discussed above. If the linear speed of the tape is within the predetermined range, the controller continues the composite deceleration tension control at step 171.

In accordance with the present invention, if, in step 180, the linear speed of the tape is less than the predetermined range of the steady state tape speed, the tension control system controller, in step 190, operates the supply reel motor and the take-up reel motor in static tension control, and optionally employs direct tension sensing of the tape tension transducer. Step 190 is represented by state 106 of FIG. 4, and comprises deceleration of the tape below the predetermined range 110 of tape speed.

Referring to FIG. 4, the combination of static tension control, and optionally direct tension sensing of the tape tension transducer of states 101, 102 and 106, with composite tension control, if the linear speed of the tape is within the predetermined range 110 of the target tape speed or of the steady state tape speed of states 103, 104 and 105, provides tension control at the full spectrum of tape speeds. Additionally, the control gains of the system provide stability enhancement at higher frequencies of tape tension variation and avoids resonances of the tape tension transducer.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A tension control system for providing dynamic tension control for tape transported along a tape path between a supply reel and a take-up reel, said supply reel driven by a supply reel motor, said take-up reel driven by a take-up reel motor, comprising:

a supply tachometer for measuring the rotational angular displacement of said supply reel;

a take-up tachometer for measuring the rotational angular displacement of said take-up reel; and a controller for operating said supply reel motor and said take-up reel motor, said controller:

upon accelerating said tape toward a target tape speed;

initially operates said supply reel motor and said take-up reel motor in static acceleration tension control;

measures said rotational angular displacement of at least one of said supply reel from said supply tachometer, and of said take-up reel from said take-up tachometer;

determines from said measured rotational angular displacement, the rotational angular velocity of at least one of said supply reel and said take-up reel;

determines from said rotational angular velocity, a linear speed for said tape;

if said linear speed of said tape is less than a predetermined range of said target tape speed, continues said static acceleration tension control;

if said linear speed of said tape is within said predetermined range of said target tape speed, operates said supply reel motor and said take-up reel motor in composite tension control employing static tension control and delta velocity control;

said delta velocity control comprising said controller:

measuring said rotational angular displacement of said supply reel from said supply tachometer;

measuring said rotational angular displacement of said take-up reel from said take-up tachometer;

determining from said measured rotational angular displacement of said supply reel, the rotational angular velocity of said supply reel;

determining from said determined rotational angular velocity of said supply reel, a linear speed for said tape at said supply reel;

determining from said measured rotational angular displacement of said take-up reel, the rotational angular velocity of said take-up reel;

determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity.

2. The tension control system of claim 1, wherein said controller operates said supply reel motor and said take-up reel motor in composite acceleration tension control towards said target tape speed and in composite steady state tension control while maintaining substantially said target tape speed.

3. The tension control system of claim 1, additionally comprising a tape tension transducer in said tape path for measuring the tension of said tape in said tape path; and wherein said controller, in initially operating said supply reel motor and said take-up reel motor in said static acceleration tension control, and in continuing said static acceleration tension control, operates said supply reel motor and said take-up reel motor additionally employing direct tension sensing of said tape tension transducer; and, in operating said supply reel motor and said take-up reel motor in said composite tension control, operates said supply reel motor and said take-up reel motor additionally employing direct tension sensing of said tape tension transducer.

4. The tension control system of claim 3, wherein said controller, in initially operating said supply reel motor and said take-up reel motor in static acceleration tension control, in continuing said static acceleration tension control, and in operating said supply reel motor and said take-up reel motor in composite tension control, each comprises said controller operating said supply reel motor and said take-up reel motor employing said direct tension control for tension variation of frequencies less than a predetermined frequency.

5. The tension control system of claim 4, wherein said predetermined frequency is less than a resonant frequency of said tape tension transducer.

6. The tension control system of claim 1, wherein said controller, in operating said supply reel motor and said take-up reel motor employing composite tension control, comprises said controller determining said rotational angular velocity of said supply reel and said take-up reel, and operating said supply reel motor and said take-up reel motor employing said composite tension control if said rotational angular velocity of each said reel exceeds a predetermined minimum rotational angular velocity related to a minimum sample rate of said determination of said rotational angular velocity.

7. A tension control system for providing dynamic tension control for tape transported along a tape path between a supply reel and a take-up reel, said supply reel driven by a supply reel motor, said take-up reel driven by a take-up reel motor, comprising:

a supply tachometer for measuring the rotational angular displacement of said supply reel;

a take-up tachometer for measuring the rotational angular displacement of said take-up reel; and a controller for operating said supply reel motor and said take-up reel motor, said controller:

upon decelerating said tape from a steady state tape speed;

initially operates said supply reel motor and said take-up reel motor in composite deceleration tension control employing static tension control and delta velocity control, said delta velocity control comprising said controller:

measuring said rotational angular displacement of said supply reel from said supply tachometer;

measuring said rotational angular displacement of said take-up reel from said take-up tachometer;

determining from said measured rotational angular displacement of said supply reel, the rotational angular velocity of said supply reel;

determining from said determined rotational angular velocity of said supply reel, a linear speed for said tape at said supply reel;

determining from said measured rotational angular displacement of said take-up reel, the rotational angular velocity of said take-up reel;

determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity; and said controller:

measures said rotational angular displacement of at least one of said supply reel from said supply tachometer, and of said take-up reel from said take-up tachometer;

determines from said measured rotational angular displacement, the rotational angular velocity of at least one of said supply reel and said take-up reel;

determines from said rotational angular velocity, a linear speed for said tape;

if said linear speed of said tape is within a predetermined range of said steady state tape speed, continues said composite deceleration tension control;

if said linear speed of said tape is less than said predetermined range of said steady state tape speed, operates said supply reel motor and said take-up reel motor in static tension control.

8. The tension control system of claim 7, additionally comprising a tape tension transducer in said tape path for measuring the tension of said tape in said tape path; and wherein said controller, in initially operating said supply reel motor and said take-up reel motor in said composite deceleration tension control, and in continuing said composite deceleration tension control, operates said supply reel motor and said take-up reel motor additionally employing direct tension sensing of said tape tension transducer; and, in operating said supply reel motor and said take-up reel motor in said static tension control, operates said supply reel motor and said take-up reel motor additionally employing direct tension sensing of said tape tension transducer.

9. Apparatus for transporting a length of tape between a supply reel and a take-up reel, comprising:
- a supply reel motor for rotating said supply reel;
- a take-up reel motor for rotating said take-up reel;
- a supply tachometer for measuring the rotational angular displacement of said supply reel;
- a take-up tachometer for measuring the rotational angular displacement of said take-up reel; and
- a controller for operating said supply reel motor and said take-up reel motor, said controller:
  - upon accelerating said tape toward a target tape speed; initially operates said supply reel motor and said take-up reel motor in static acceleration tension control;
  - measures said rotational angular displacement of at least one of said supply reel from said supply tachometer, and of said take-up reel from said take-up tachometer;
  - determines from said measured rotational angular displacement, the rotational angular velocity of at least one of said supply reel and said take-up reel;
  - determines from said rotational angular velocity, a linear speed for said tape;
  - if said linear speed of said tape is less than a predetermined range of said target tape speed, continues said static acceleration tension control;
  - if said linear speed of said tape is within said predetermined range of said target tape speed, operates said supply reel motor and said take-up reel motor in composite tension control employing static tension control and delta velocity control;
  - said delta velocity control comprising said controller:
  - measuring said rotational angular displacement of said supply reel from said supply tachometer;
  - measuring said rotational angular displacement of said take-up reel from said take-up tachometer;
  - determining from said measured rotational angular displacement of said supply reel, the rotational angular velocity of said supply reel;
  - determining from said determined rotational angular velocity of said supply reel, a linear speed for said tape at said supply reel;
  - determining from said measured rotational angular displacement of said take-up reel, the rotational angular velocity of said take-up reel;
  - determining from said determined rotational angular velocity of said take-up reel, a linear speed for said tape at said take-up reel;
  - comparing said determined linear speed for said tape at said supply reel to said determined linear speed for said tape at said take-up reel, to determine a delta velocity between said linear speeds; and
  - operating at least one of said supply reel motor and said take-up reel motor in accordance with a function of said delta velocity to provide a torque to at least one of said supply reel and said take-up reel tending to reduce said delta velocity.

10. The apparatus of claim 9, wherein said controller operates said supply reel motor and said take-up reel motor in composite acceleration tension control towards said target tape speed and in composite steady state tension control while maintaining substantially said target tape speed.

11. The apparatus of claim 9, additionally comprising a tape tension transducer in said tape path for measuring the tension of said tape in said tape path; and wherein said controller, in initially operating said supply reel motor and said take-up reel motor in said static acceleration tension control, and in continuing said static acceleration tension control, operates said supply reel motor and said take-up reel motor additionally employing direct tension sensing of said tape tension transducer; and, in operating said supply reel motor and said take-up reel motor in said composite tension control, operates said supply reel motor and said take-up reel motor additionally employing direct tension sensing of said tape tension transducer.

12. The apparatus of claim 11, wherein said controller, in initially operating said supply reel motor and said take-up reel motor in static acceleration tension control, in continuing said static acceleration tension control, and in operating said supply reel motor and said take-up reel motor in composite tension control, each comprises said controller operating said supply reel motor and said take-up reel motor employing said direct tension control for tension variation of frequencies less than a predetermined frequency.

13. The apparatus of claim 12, wherein said predetermined frequency is less than a resonant frequency of said tape tension transducer.

14. The apparatus of claim 9, wherein said controller, in operating said supply reel motor and said take-up reel motor employing composite tension control, comprises said controller determining said rotational angular velocity of said supply reel and said take-up reel, and operating said supply reel motor and said take-up reel motor employing said composite tension control if said rotational angular velocity of each said reel exceeds a predetermined minimum rotational angular velocity related to a minimum sample rate of said determination of said rotational angular velocity.

15. Apparatus for transporting a length of tape between a supply reel and a take-up reel, comprising:
- a supply reel motor for rotating said supply reel;
- a take-up reel motor for rotating said take-up reel;
- a supply tachometer for measuring the rotational angular displacement of said supply reel;
- a take-up tachometer for measuring the rotational angular displacement of said take-up reel; and
- a controller for operating said supply reel motor and said take-up reel motor, said controller:
  - upon decelerating said tape from a steady state tape speed; initially operates said supply reel motor and said take-up reel motor in composite deceleration tension control employing static tension control and delta velocity control,
  - said delta velocity control comprising said controller:
  - measuring said rotational angular displacement of said supply reel from said supply tachometer;
  - measuring said rotational angular displacement of said take-up reel from said take-up tachometer;
  - determining from said measured rotational angular displacement of said supply reel, the rotational angular velocity of said supply reel;

determining from said determined rotational angular velocity of said supply reel, a linear speed for said tape at said supply reel;

determining from said measured rotational angular displacement of said take-up reel, the rotational angular velocity of said take-up reel;

determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity; and said controller:

measures said rotational angular displacement of at least one of said supply reel from said supply tachometer, and of said take-up reel from said take-up tachometer;

determines from said measured rotational angular displacement, the rotational angular velocity of at least one of said supply reel and said take-up reel;

determines from said rotational angular velocity, a linear speed for said tape;

if said linear speed of said tape is within a predetermined range of said steady state tape speed, continues said composite deceleration tension control;

if said linear speed of said tape is less than said predetermined range of said steady state tape speed, operates said supply reel motor and said take-up reel motor in composite tension control employing static tension control.

16. The apparatus of claim 15, additionally comprising a tape tension transducer in said tape path for measuring the tension of said tape in said tape path; and wherein said controller, in initially operating said supply reel motor and said take-up reel motor in said composite deceleration tension control, and in continuing said composite deceleration tension control, operates said supply reel motor and said take-up reel motor additionally employing direct tension sensing of said tape tension transducer; and, in operating said supply reel motor and said take-up reel motor in said static tension control, operates said supply reel motor and said take-up reel motor additionally employing direct tension sensing of said tape tension transducer.

17. A magnetic tape drive for transporting a magnetic tape along a tape path between a supply reel and a take-up reel, comprising:

a read/write head located in said tape path, such that said magnetic tape is transported between said supply reel and said take-up reel past said read/write head;

a supply reel motor for rotating said supply reel;

a take-up reel motor for rotating said take-up reel;

a supply tachometer for measuring the rotational angular displacement of said supply reel;

a take-up tachometer for measuring the rotational angular displacement of said take-up reel; and a controller for operating said supply reel motor and said take-up reel motor, said controller:

upon accelerating said magnetic tape toward a target tape speed;

initially operates said supply reel motor and said take-up reel motor in static acceleration tension control;

measures said rotational angular displacement of at least one of said supply reel from said supply tachometer, and of said take-up reel from said take-up tachometer;

determines from said measured rotational angular displacement, the rotational angular velocity of at least one of said supply reel and said take-up reel;

determines from said rotational angular velocity, a linear speed for said magnetic tape;

if said linear speed of said magnetic tape is less than a predetermined range of said target tape speed, continues said static acceleration tension control;

if said linear speed of said magnetic tape is within said predetermined range of said target tape speed, operates said supply reel motor and said take-up reel motor in composite tension control employing static tension control and delta velocity control;

said delta velocity control comprising said controller:

measuring said rotational angular displacement of said supply reel from said supply tachometer;

measuring said rotational angular displacement of said take-up reel from said take-up tachometer;

determining from said measured rotational angular displacement of said supply reel, the rotational angular velocity of said supply reel;

determining from said determined rotational angular velocity of said supply reel, a linear speed for said tape at said supply reel;

determining from said measured rotational angular displacement of said take-up reel, the rotational angular velocity of said take-up reel;

determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity.

18. The magnetic tape drive of claim 17, wherein said controller operates said supply reel motor and said take-up reel motor in composite acceleration tension control towards said target tape speed and in composite steady state tension control while maintaining substantially said target tape speed.

19. The magnetic tape drive of claim 17, additionally comprising a tape tension transducer in said tape path for measuring the tension of said tape in said tape path; and wherein said controller, in initially operating said supply reel motor and said take-up reel motor in said static acceleration tension control, and in continuing said static acceleration tension control, operates said supply reel motor and said take-up reel motor additionally employing direct tension sensing of said tape tension transducer; and, in operating said supply reel motor and said take-up reel motor in said composite tension control, operates said supply reel motor and said take-up reel motor additionally employing direct tension sensing of said tape tension transducer.

20. The magnetic tape drive of claim 19, wherein said controller, in initially operating said supply reel motor and said take-up reel motor in static acceleration tension control, in continuing said static acceleration tension control, and in operating said supply reel motor and said take-up reel motor in composite tension control, each comprises said controller operating said supply reel motor and said take-up reel motor employing said direct tension control for tension variation of frequencies less than a predetermined frequency.

21. The magnetic tape drive of claim 20, wherein said predetermined frequency is less than a resonant frequency of said tape tension transducer.

22. The magnetic tape drive of claim 17, wherein said controller, in operating said supply reel motor and said take-up reel motor employing composite tension control, comprises said controller determining said rotational angular velocity of said supply reel and said take-up reel, and operating said supply reel motor and said take-up reel motor employing said composite tension control if said rotational angular velocity of each said reel exceeds a predetermined minimum rotational angular velocity related to a minimum sample rate of said determination of said rotational angular velocity.

23. A magnetic tape drive for transporting a magnetic tape along a tape path between a supply reel and a take-up reel, comprising:
    a read/write head located in said tape path, such that said magnetic tape is transported between said supply reel and said take-up reel past said read/write head;
    a supply reel motor for rotating said supply reel;
    a take-up reel motor for rotating said take-up reel;
    a supply tachometer for measuring the rotational angular displacement of said supply reel;
    a take-up tachometer for measuring the rotational angular displacement of said take-up reel; and
    a controller for operating said supply reel motor and said take-up reel motor, said controller:
    upon decelerating said magnetic tape from a steady state tape speed;
    initially operates said supply reel motor and said take-up reel motor in composite deceleration tension control employing static tension control arid delta velocity control,
    said delta velocity control comprising said controller:
      measuring said rotational angular displacement of said supply reel from said supply tachometer;
      measuring said rotational angular displacement of said take-up reel from said take-up tachometer;
      determining from said measured rotational angular displacement of said supply reel, the rotational angular velocity of said supply reel;
      determining from said determined rotational angular velocity of said supply reel, a linear speed for said tape at said supply reel;
      determining from said measured rotational angular displacement of said take-up reel, the rotational angular velocity of said take-up reel;
      determining from said determined rotational angular velocity of said take-up reel, a linear speed for said tape at said take-up reel;
      comparing said determined linear speed for said tape at said supply reel to said determined linear speed for said tape at said take-up reel, to determine a delta velocity between said linear speeds; and
      operating at least one of said supply reel motor and said take-up reel motor in accordance with a function of said delta velocity to provide a torque to at least one of said supply reel and said take-up reel tending to reduce said delta velocity; and
    said controller:
      measures said rotational angular displacement of at least one of said supply reel from said supply tachometer, and of said take-up reel from said take-up tachometer;
      determines from said measured rotational angular displacement, the rotational angular velocity of at least one of said supply reel and said take-up reel;
      determines from said rotational angular velocity, a linear speed for said magnetic tape;
      if said linear speed of said magnetic tape is within a predetermined range of said steady state tape speed, continues said composite deceleration tension control;
      if said linear speed of said magnetic tape is less than said predetermined range of said steady state tape speed, operates said supply reel motor and said take-up reel motor in static tension control.

24. The magnetic tape drive of claim 23, additionally comprising a tape tension transducer in said tape path for measuring the tension of said tape in said tape path; and wherein said controller, in initially operating said supply reel motor and said take-up reel motor in said composite deceleration tension control, and in continuing said composite deceleration tension control, operates said supply reel motor and said take-up reel motor additionally employing direct tension sensing of said tape tension transducer; and, in operating said supply reel motor and said take-up reel motor in said static tension control, operates said supply reel motor and said take-up reel motor additionally employing direct tension sensing of said tape tension transducer.

25. A method for providing dynamic tension control for tape transported along a tape path between a supply reel and a take-up reel, said supply reel driven by a supply reel motor, said take-up reel driven by a take-up reel motor, said method comprising the steps of:
    upon accelerating said tape toward a target tape speed;
    initially operating said supply reel motor and said take-up reel motor in static acceleration tension control;
    determining the rotational angular velocity of at least one of said supply reel and said take-up reel;
    determining from said rotational angular velocity, a linear speed for said tape;
    if said linear speed of said tape is less than a predetermined range of said target tape speed, continuing said static acceleration tension control;
    if said linear speed of said tape is within said predetermined range of said target tape speed, operating said supply reel motor and said take-up reel motor in composite tension control employing static tension control and delta velocity control;
    said delta velocity control comprising:
      measuring said rotational angular displacement of said supply reel from said supply tachometer;
      measuring said rotational angular displacement of said take-up reel from said take-up tachometer;
      determining from said measured rotational angular displacement of said supply reel, the rotational angular velocity of said supply reel;
      determining from said determined rotational angular velocity of said supply reel, a linear speed for said tape at said supply reel;
      determining from said measured rotational angular displacement of said take-up reel, the rotational angular velocity of said take-up reel;
      determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity.

26. The method of claim 25, wherein said composite tension control step comprises employing acceleration tension control towards said target tape speed and composite steady state tension control while maintaining substantially said target tape speed.

27. The method of claim 25, additionally having a tape tension transducer in said tape path for measuring the tension of said tape in said tape path; and wherein said steps of initially operating said supply reel motor and said take-up reel motor in static acceleration tension control, and continuing said static acceleration tension control, comprise operating said supply reel motor and said take-up reel motor additionally employing direct tension sensing of said tape tension transducer, and said step of operating said supply reel motor and said take-up reel motor in composite tension control comprises operating said supply reel motor and said take-up reel motor additionally employing direct tension sensing of said tape tension transducer.

28. The method of claim 27, wherein said steps of initially operating said supply reel motor and said take-up reel motor in static acceleration tension control, continuing said static acceleration tension control, and operating said supply reel motor and said take-up reel motor in composite tension control, each comprises operating said supply reel motor and said take-up reel motor employing said direct tension control for tension variation of frequencies less than a predetermined frequency.

29. The method of claim 28, wherein said predetermined frequency is less than a resonant frequency of said tape tension transducer.

30. The method of claim 25, wherein said step of operating said supply reel motor and said take-up reel motor employing composite tension control comprises determining said rotational angular velocity of said supply reel and said take-up reel, and operates said supply reel motor and said take-up reel motor employing said composite tension control if said rotational angular velocity of each said reel exceeds a predetermined minimum rotational angular velocity related to a minimum sample rate of said determination of said rotational angular velocity.

31. A method for providing dynamic tension control for tape transported along a tape path between a supply reel and a take-up reel, said supply reel driven by a supply reel motor, said take-up reel driven by a take-up reel motor, said method comprising the steps of:

upon decelerating said tape from a steady state tape speed;

initially operating said supply reel motor and said take-up reel motor in composite deceleration tension control employing static tension control and delta velocity control, said delta velocity control comprising:

measuring said rotational angular displacement of said supply reel from said supply tachometer;

measuring said rotational angular displacement of said take-up reel from said take-up tachometer;

determining from said measured rotational angular displacement of said supply reel, the rotational angular velocity of said supply reel;

determining from said determined rotational angular velocity of said supply reel, a linear speed for said tape at said supply reel;

determining from said measured rotational angular displacement of said take-up reel, the rotational angular velocity of said take-up reel;

determining from said determined rotational angular velocity of said take-up reel, a linear speed for said tape at said take-up reel;

comparing said determined linear speed for said tape at said supply reel to said determined linear speed for said tape at said take-up reel, to determine a delta velocity between said linear speeds; and operating at least one of said supply reel motor and said take-up reel motor in accordance with a function of said delta velocity to provide a torque to at least one of said supply reel and said take-up reel tending to reduce said delta velocity; and said method further comprising:

determining the rotational angular velocity of at least one of said supply reel and said take-up reel;

determining from said rotational angular velocity, a linear speed for said tape;

if said linear speed of said tape is within a predetermined range of said steady state tape speed, continuing said composite deceleration tension control;

if said linear speed of said tape is less than said predetermined range of said steady state tape speed, operating said supply reel motor and said take-up reel motor in static tension control.

32. The method of claim 31, additionally having a tape tension transducer in said tape path for measuring the tension of said tape in said tape path; and wherein said steps of initially operating said supply reel motor and said take-up reel motor in said composite deceleration tension control, and continuing said composite deceleration tension control, comprise operating said supply reel motor and said take-up reel motor additionally employing direct tension sensing of said tape tension transducer, and said step of operating said supply reel motor and said take-up reel motor in said static tension control comprises operating said supply reel motor and said take-up reel motor additionally employing direct tension sensing of said tape tension transducer.

* * * * *